United States Patent [19]

Duret

[11] Patent Number: 4,944,255
[45] Date of Patent: Jul. 31, 1990

[54] TWO-STROKE ENGINE WITH PNEUMATIC INJECTION AND FLOWRATE RESTRICTION AT THE EXHAUST

[75] Inventor: Pierre Duret, Paris, France
[73] Assignee: Institut Francais du Petrole, Rueil Malmaison, France
[21] Appl. No.: 254,266
[22] Filed: Oct. 6, 1988
[30] Foreign Application Priority Data Oct. 7, 1987 [FR] France .................. 87 13837

[51] Int. Cl.$^5$ ............................. F02B 33/04
[52] U.S. Cl. .................... 123/65 EM; 123/73 C; 123/323
[58] Field of Search ............ 123/73 C, 65 A, 65 PE, 123/65 EM, 323

[56] References Cited

U.S. PATENT DOCUMENTS

| | | |
|---|---|---|
| 1,818,796 | 8/1931 | Fevens . |
| 3,190,271 | 6/1965 | Gudmundsen ............ 123/73 C |
| 3,938,330 | 2/1976 | Nakajima et al. ............ 60/294 |
| 4,180,029 | 12/1979 | Onishi ............ 123/65 EM |
| 4,445,468 | 5/1984 | Onishi et al. ............ 123/73 C |
| 4,579,093 | 4/1986 | Eanes ............ 123/65 BA |

FOREIGN PATENT DOCUMENTS

| | | |
|---|---|---|
| 164700 | 5/1949 | Austria ............ 123/65 BA |
| 3103732 | 9/1982 | Fed. Rep. of Germany . |
| 369866 | 2/1983 | Fed. Rep. of Germany . |
| 490166 | 4/1919 | France . |
| 112459 | 10/1924 | Switzerland . |
| 2175643 | 12/1986 | United Kingdom . |

OTHER PUBLICATIONS

372 "Automotive Engineering" 94, (1986) Aug., No. 8, Warrendale, Pa., Pneumatic Fuel Injection Spurs Two-Stroke Revival.
Patent Abstracts of Japan vol. 3, No. 186 (M-320) (1623) Aug. 25, 1984 (2 pages); appl. No. 57-187754.

*Primary Examiner*—David A. Okonsky
*Attorney, Agent, or Firm*—Antonelli, Terry, Stout & Kraus

[57] ABSTRACT

A two-stroke engine having at least one cylinder in which a piston is movably accommodated, with a crank case communicating with one end of the at least one cylinder. Air is admitted to the crank case and at least one pipe admits unmixed air from the crank case to a cylinder transfer port. The fuel is pneumatically injected into the cylinder by way of a pneumatic injector and a pipe connected to the crank case by a valve and forming a volume of pressurized air connected to the pneumatic injector supplies the pneumatic injector with pressurized air for atomizing the fuel. An exhaust pipe is connected to the at least one cylinder by an exhaust port located in a position offset in a direction of travel of the piston with respect to the cylindrical transfer port of the cylinder. At least one restricting element is disposed inside the exhaust pipe in a vicinity of the cylinder for restricting a passage of the exhaust gases, with the restricting element being controlled and adjusted as a function of at least one engine operating parameter.

15 Claims, 3 Drawing Sheets

U.S. Patent   Jul. 31, 1990   Sheet 3 of 3   4,944,255
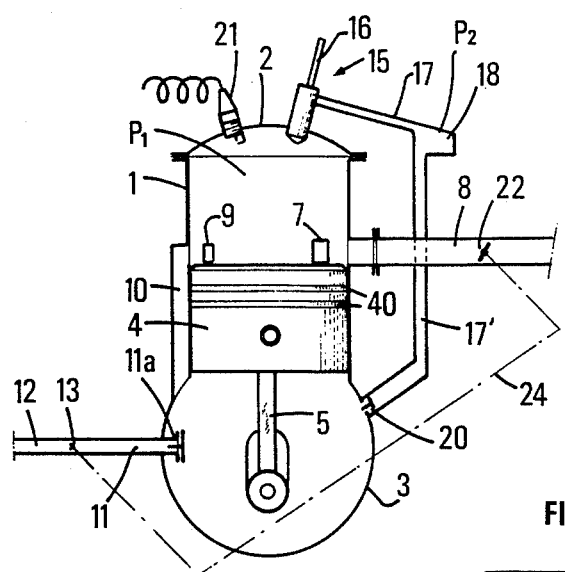
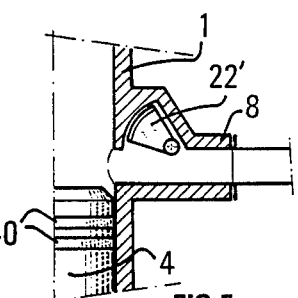
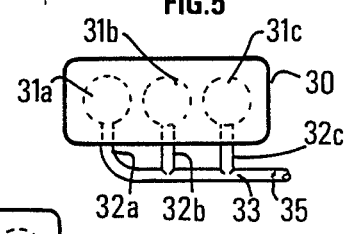
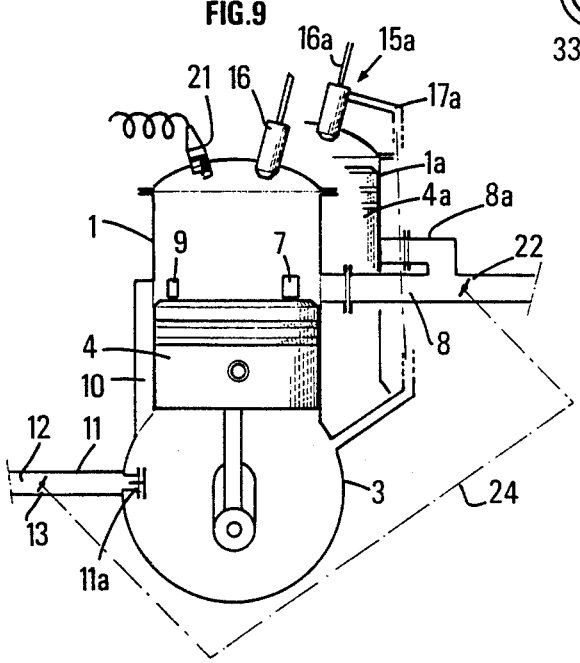
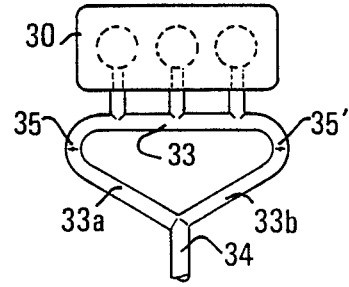
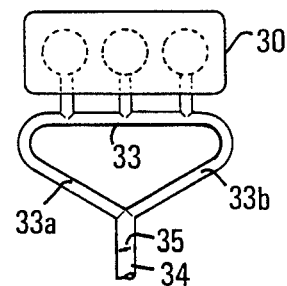

TWO-STROKE ENGINE WITH PNEUMATIC INJECTION AND FLOWRATE RESTRICTION AT THE EXHAUST

BACKGROUND OF THE INVENTION

The invention relates to a two-stroke engine with pneumatic fuel injection and restriction of a flowrate at the exhaust.

Two-stroke engines with one or more cylinders generally have, associated with each of the cylinders, a crankcase called a pump-crankcase communicating with one end of the cylinder and allowing introduction of fresh gas into the cylinder through at least one pipe and one transfer port. The reciprocating piston in the cylinder also provides intake and compression of fresh gases in the pump-crankcase.

An intake valve located on the pump-crankcase allows fresh gases to enter the crankcase when the piston moves in the direction away from the crankcase. The fresh gases are then compressed and close the valve when the piston moves toward the crankcase. When the corresponding cylinder ports are cleared by the piston, fresh gases are introduced into the cylinder via the pipes and transfer ports and scavenge the burned gases which are discharged through exhaust ports generally disposed slightly offset with respect to the transfer ports.

The piston moves away from the crankcase to compress the gases contained in the cylinder. Ignition and combustion of the mixture then cause the power stroke of the piston toward the crankcase.

French Patent FR-2.496.757 proposed providing a device for pneumatic injection of fuel into the cylinder using the pressure of the fresh gases inside the pump-crankcase. To accomplish this, a means of dispensing liquid fuel is connected directly to the pipe from the pump-crankcase. The compressed air in the pump-crankcase fed to the dispenser through the pipe ensures atomization and injection of the fuel into the cylinder.

A number of improvements have been made to the aforementioned proposed device and it has been proposed, for example, to provide a volume in the pipe connecting the pump-crankcase to the injector and a valve at the end of the pipe connected to the pump-crankcase. This provides a compressed-air reserve at a pressure close to the maximum pressure in the pump-crankcase during the cycle. This compressed-air reserve then serves to atomize the fuel and introduce it into the cylinder in the form of a gas and air mixture when the injector is actuated.

One of the drawbacks of two-stroke engines is the loss of efficiency due to the fact that the fresh gases mixed with air are insufficiently separated from the gases burned inside the cylinder and are hence responsible for creating conditions unfavorable to initiation of combustion.

To remedy this drawback, it has been proposed that a flowrate restriction element be placed in the engine exhaust pipe in the vicinity of the cylinder to slow down the discharge of burned gases. This provides stratification of the fresh gases and the burned gases since the fresh gases are driven back into the zone of the cylinder where injection and ignition take place. However, such an exhaust flowrate restriction technique has never been used in the case of a two-stroke engine having a pneumatic injection device using the compressed air from the pump-crankcase.

On the other hand, in the case of pneumatic injection using compressed air from the pump-crankcase, the pressure differential between the air used for injection and the gases filling the cylinder at the time of injection is generally too small to ensure good atomization of the fuel and high injection efficiency. This drawback remains significant when a volume associated with the injector and a pipe separated by a pump-crankcase valve are used. The pressure in the volume, which is at most equal to the maximum pressure in the pump-crankcase, is not sufficiently higher than the pressure in the cylinder at the time of injection, so that the pressure in the cylinder is increased by wave effects in the exhaust pipe.

Hence, the goal of the invention is to propose, according to a first embodiment, a two-stroke engine with at least one cylinder in which the piston moves, with a crankcase communicating with one end of the cylinder and having a means for admitting air into the crankcase. At least one pipe is provided for admitting air not mixed with fuel into the cylinder, which joins the crankcase to a cylinder transfer port with a device pneumatically injecting fuel into the cylinder comprising a pneumatic injector. A means on this pneumatic injector supplies and meters pressurized air for atomizing the fuel, and the pipe is connected to the crankcase through a valve and comprises a volume of pressurized air connected to the pneumatic injector. An exhaust pipe is connected to the cylinder via an exhaust port located offset in the direction of piston travel with respect to the transfer port of the cylinder, with this two-stroke engine having increased efficiency and improved function because of improved atomization and injection of fuel into the cylinder.

With this goal in view, the engine according to the invention also has, inside the exhaust pipe, in the vicinity of the cylinder, an element for restricting the passage of the exhaust gases, whose opening and closing are controlled and adjusted as a function of at least one engine operating parameter.

The present invention also relates to another embodiment according to which the two-stroke engine has a first cylinder in which a first piston moves, a second cylinder in which another piston moves, with a crankcase communicating with one end of said second cylinder. This engine also has a means for admitting air into the crankcase, at least one pipe for admitting non-mixed air into the first cylinder, with the pipe being connected to an opening in the first cylinder. A device is provided for pneumatic injection of fuel into the first cylinder comprising a pneumatic injector, with a means supplying and metering fuel to this pneumatic injector, and a pipe supplying the injector with pressurized air for atomization of the fuel. The pipe is connected to the crankcase, and an exhaust pipe is connected to the first cylinder by an exhaust port located in the wall of the first cylinder.

In addition, this engine has, inside the exhaust pipe, in the vicinity of the first cylinder, an element for restricting the passage of the exhaust gases coming from this cylinder, whose opening and closing are controlled and regulated as a function of at least one engine operating parameter.

There is a non-zero angular displacement between the cycles of these two cylinders. This angular displacement may be 120°, with the cycle of the first cylinder leading the cycle of the second cylinder by 120°. The engine may have a number of cylinders which is a multiple of 3.

This angular displacement may be 90°, with the cycle of the first cylinder leading the cycle of the second cylinder by 90°. The engine may have a number of cylinders which is a multiple of 4.

The pipe supplying the injector with pressurized air may connect said pneumatic injector directly to the crankcase. This means that this pipe will not include a volume for storage of pressurized gas.

As a result, the part of this pipe connecting the crankcase to the pneumatic injector may advantageously have no check valve and may be small in volume.

BRIEF DESCRIPTION OF THE DRAWINGS

In order to explain the invention, a two-stroke engine with exhaust flowrate restriction according to the invention and its method of operating by comparison with the operation of a two-stroke engine according to the prior art will now be described as a non-limitative example with reference to the accompanying drawings:

FIG. 3 is a schematic elevation and cross section of a two-stroke engine with pneumatic injection and exhaust gas flow rate restriction according to the invention, FIG. 4 is a larger-scale view of an alternative embodiment of the engine flowrate-restriction means according to the invention, FIGS. 5, 6, 7, and 8 are schematic top views of a three-cylinder two-stroke engine according to the invention whose exhaust pipes are associated with one or more flowrate-restriction elements and constitute four alternative embodiments of the engine according to the invention, and FIG. 9 relates to an embodiment according to which the pneumatic injector of a cylinder is supplied with pressurized gas from the crankcase of another cylinder.

DETAILED DESCRIPTION

Figure 1:
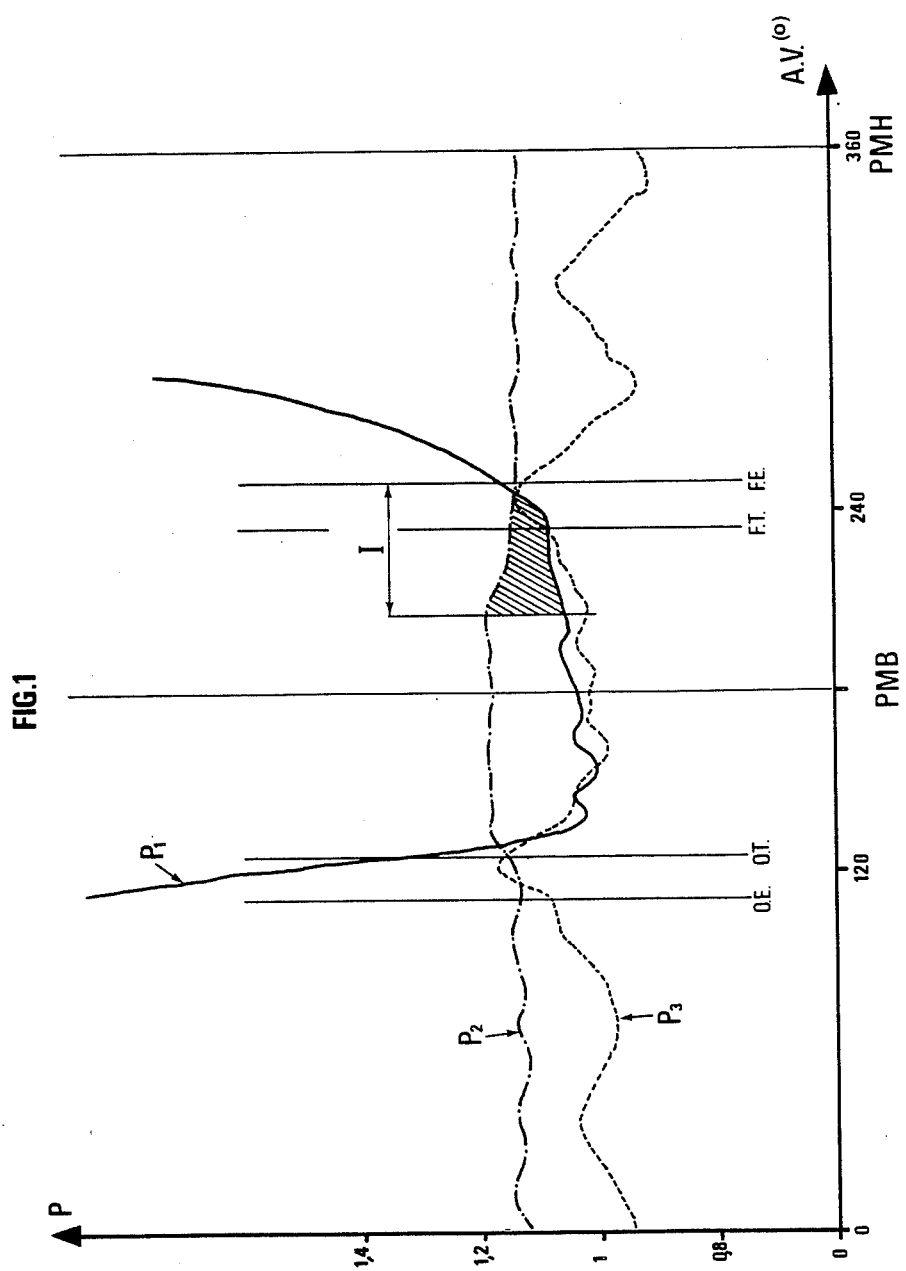
FIG. 1 shows pressure curves plotted during operation of a two-stroke pneumatic injection engine according to the prior art.
Figure 2:
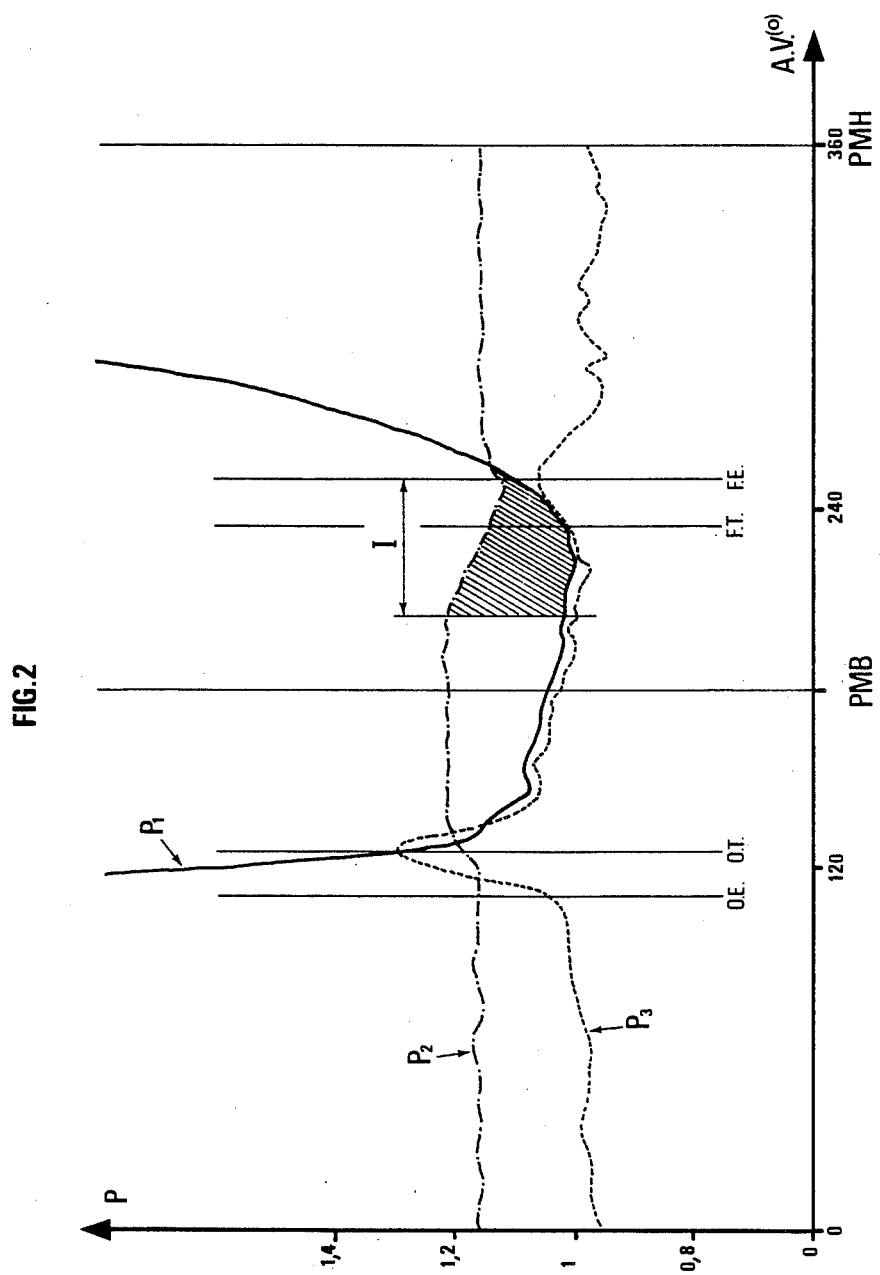
FIG. 2 shows pressure curves plotted during corresponding operation of a pneumatic injection engine with exhaust flowrate restriction according to the invention.

FIG. 1 and FIG. 2 show the pressure variations in the cylinder (curve P1), in the volume of the pneumatic injection device (curve P2) and at the inlet of the exhaust pipe (curve P3) as a function of the rotational angle of the crankshaft in the case of an engine according to the prior art with pneumatic injection and in the case of an engine according to the invention, respectively.

An engine according to the prior art whose operating curve is shown in FIG. 1 may be described on the basis of the same elements, with the exception of the regulated exhaust flowrate restriction assembly.

The engine has a cylinder 1 closed at its upper part by a cylinder head 2 and communicating at its lower part with a pump-crankcase 3, the chamber of cylinder 1 and the internal volume of pump-crankcase 3 being disposed on either side of piston 4 and reciprocating inside cylinder 1. Piston 4 is connected by a connecting rod 5 to crankshaft 6. The wall of cylinder 1 is provided with exhaust ports or openings 7 communicating with an exhaust pipe 8.

The transfer ports or openings 9 located slightly offset downward with respect to openings 7 communicate with a transfer pipe 10 connected to the interior volume of pump-crankcase 3.

A pump-crankcase 3 is provided with an orifice 11 equipped with a valve 11a and communicating with an air intake pipe 12 in which is placed a throttle valve 13 able to close the passage cross section of pipe 12 to a greater or lesser degree. A pneumatic injector 15 attached to cylinder head 2, having a spark plug 21 attached thereto, emerges into the upper part of cylinder 1. Pneumatic injector 15 which may be of the type described and shown in FIG. 7 of French Patent FR-2.496.757 is supplied with liquid fuel by a pipe 16 and with compressed air by a pipe 17 in which is located a compressed-air storage volume 18. Compressed-air volume 18 is itself connected via a pipe 17' which extends pipe 17 to pump-crankcase 3. The orifice that causes crankcase 3 and pipe 17' to communicate has a valve 20 which is lifted off its seat to provide communication between crankcase 3 and pipe 17' when the pressure exceeds a certain limit in crankcase 3. When valve 20 lifts off its seat, the compressed air in crankcase 3 can fill volume 18 and recharge it.

Pneumatic injector 15 may have a rod controlled by a cam ensuring the start of injection at a particular point in the engine's operating cycle. The pressurized air in volume 18 then atomizes the fuel fed to the pneumatic injector by pipe 16 which may have a means for dispensing the fuel and introducing atomized fuel in suspension in the pressurized air inside cylinder 1.

A flowrate restriction element 22 comprising a throttle valve is disposed inside exhaust pipe 8 near cylinder 1. Throttle valve 22 may be connected to throttle valve 13 of pipe 12 which introduces air into pump-crankcase 3 by an articulated linking and control assembly 24 providing opening and closing of throttle valve 22 as a function of the opening and closing of throttle valve 13.

Flowrate restriction element 22 and the means 24 which link it to throttle valve 13 ensuring proportional action of these two flowrate restriction elements constitutes the essential characteristic element of the device enabling pneumatic injection performance to be considerably enhanced, as will be explained later with reference to FIGS. 1 and 2.

A pneumatic injection two-stroke engine as shown in FIG. 3 operates as explained below.

If we assume that, at the initial instant, piston 4 is at top dead center, the air-gas mixture being compressed in the upper part of cylinder 1, ignition of this mixture by spark plug 21 causes combustion which drives piston 4 downward. During its downward stroke, cylinder 4 uncovers exhaust ports 7 then, slightly later, uncovers transfer ports 9. The exhaust gases are driven into pipes 8 and the air compressed by the piston in pump-crankcase 3 is sent to the cylinder by transfer pipes 10.

The air pressure in pump-crankcase 3 increases to a maximum, with valve 11a closed. When the air pressure in pump-crankcase 3 exceeds that of the volume, valve 20 opens and volume 18 is recharged with air at a pressure close to the maximum pressure in pump-crankcase 3. Valve 20 closes again and piston 4 arrives at bottom dead center, then begins to move upward again. Fuel is injected at the top of the cylinder by injector 15 using the compressed air from chamber 18. In its upward movement, piston 4 covers ports 9 and 7 and compresses the air-gas mixture. Valve 11a opens and air is admitted into pump-crankcase 3.

FIGS. 1 and 2 show the variation in pressure in the cylinder, in the volume of the pneumatic injection device, and in the exhaust pipe as a function of the crankshaft angle through a complete cycle, in the case of a pneumatic injection two-stroke engine according to the prior art and in the case of a two-stroke engine according to the invention, respectively.

The bottom dead center and top dead center positions PMB and PMH, respectively, are shown on the abscissa in FIGS. 1 and 2. The positions corresponding to opening and closing of transfer ports 9 and the positions corresponding to opening and closing of exhaust ports 7 are also shown.

In the case of an engine according to the prior art (FIG. 1), pressure P1 in the cylinder decreases rapidly when the piston moves toward bottom dead center, this movement being accompanied by opening of the exhaust port (OE) and the transfer port (OT). Simultaneously, the exhaust gases exit into pipe 8 and the cylinder is scavenged by the compressed air from pump-crankcase 3. The exit of the exhaust gases is accompanied by pressure wave effects shown on Curve P3 representing the exhaust pressure. It can be seen in particular that the return of the pressure wave occurs at about the end of the scavenging marked by transfer closing and exhaust closing points (FT) and (FE).

The return of the pressure wave to the cylinder causes perturbations and an increase in pressure P1 in the cylinder at the end of scavenging.

Pressure P2 in the volume is established at the beginning of scavenging at a maximum value corresponding essentially to the maximum pressure value in pump-crankcase 3.

Injection (I) is triggered at the end of scavenging, this period being favorable because of the relatively low pressure in the cylinder and the smaller risk of fuel being swept out through the exhaust with the burned gases.

Injection is provided by the pressurized air P2 filling volume 18. The quality of fuel atomization and of injection, at the time the rod of injector 15 is displaced, depending on the pressure differential between volume 18 and the cylinder.

In FIG. 1, this variable pressure differential during injection corresponds to the vertical distance between curves P2 and P1. The area of the shaded zone between these curves during injection I gives a picture of the energy usable for injection. The pressure differential $\Delta P = P2 - P1$ decreases during injection and becomes zero before exhaust closing FE. Indeed, pressure P1 first increases slowly then rapidly at the end of scavenging while pressure P2 decreases during injection as some of the compressed air is emptied from volume 18.

FIG. 2 shows the operating curve for a two-stroke engine according to the invention having an exhaust restriction element 22.

Pressure P3 in the exhaust pipe, upstream of restriction element 22, increases very sharply just after exhaust opening (OE) which is due to a burst effect, i.e. the large pressure differential between the cylinder and the exhaust pipe at time OE. However, this pressure rise propagates very little in the exhaust pipe due to the presence of restriction element 22 and the pressure falls back very rapidly then more slowly, to settle at a maximum value at the end of scavenging.

The wave effects present in the case of the engine according to the prior art (FIG. 1) have practically disappeared and, in particular, no pressure wave return occurs at the end of scavenging. As a result, pressure P1 in the cylinder is barely perturbed and decreases regularly until the end of scavenging. During the injection period, this pressure is at a minimum and rises rapidly again only at the time of transfer closing and exhaust closing.

On the other hand, the presence of restriction element 22 slows down the emptying of cylinder 1 during the first part of scavenging, between exhaust opening (OE) and bottom dead center.

Since it is more difficult for the cylinder to empty into the exhaust, there is some difficulty in the emptying of pump-crankcase 3 in the cylinder via pipes and transfer openings 10, 9.

The air contained in the crankcase, which was compressed when piston 1 moved downward, now reaches a maximum pressure during the initial scavenging phase, which is higher than would be the case if there were no flowrate restriction in the exhaust pipe. Volume 18, charged with compressed air at a pressure close to the maximum pressure of pump-crankcase 3, thus reaches an upper pressure plateau (curve P2) at a higher level than in the case of an engine according to the prior art.

As a result, pressure differential $\Delta P = P2 - P1$ is larger throughout injection phase I, in the case of an engine according to the invention (FIG. 2) than in the case of an engine according to the prior art (FIG. 1). This favorable effect is obtained both due to a lower pressure P1 and a higher pressure P2, at least at the beginning of injection.

In the case of the engine according to the prior art, at the same opening point, the pressure in the cylinder has a minimum value during injection on the order of 1.05 bars, while this minimum pressure is only 1.00 bar in the case of an engine according to the invention.

The pressure P2 at which the volume is charged at the beginning of injection is 1.18 bars in the case of the engine according to the prior art (FIG. 1) and 1.22 bars in the case of the engine according to the invention.

As a result, in the case of the engine according to the prior art $\Delta P = 1.18 - 1.05 = 0.13$ bar and in the case of an engine according to the invention $\Delta P = 1.22 - 1.00 = 0.22$ bar at the beginning of the injection.

Thus, quite a substantial gain in pressure differential is obtained, resulting in a marked increase in the quantity of air arriving at the injector and serving to atomize the fuel, and likewise a substantial increase in the flowrate of this air bringing about atomization and injection.

Hence, the fuel is atomized more finely and introduced inside the cylinder under the best conditions.

The setting of the opening or closing position of restriction element 22 as a function of the corresponding position of admission valve 13 should allow a maximum pressure differential P to be obtained throughout the injection phase, leading to as high as possible an injection energy represented by the shaded zone in FIG. 2.

In the embodiment shown in FIG. 3, the position of valve 13 varies with the engine load so that linking assembly 24 also allows the position of restriction element 22 to be regulated as a function of engine load.

FIG. 4 shows an alternative embodiment of restriction element 22' located at the inlet to exhaust pipe 8. Device 22' is composed of an articulated flap rotating about a horizontal axis on a part of cylinder 1 associated with the exhaust opening and constituting the initial part of pipe 8. Flap 22' has a sealing surface which can, at least partially, block the cylinder exhaust opening when flap 22' is in the down position.

The sealing surface is then very close to the chamber of cylinder 1 and piston 4 and piston rings 40 come practically into contact with this sealing surface when the interior surface of cylinder 1 is scavenged.

FIG. 9 shows an embodiment wherein cylinder 1A has a pneumatic injector 15A supplied with fuel through a pipe 16A and with air, or, more generally, with a pressurized gas, through pipe 17A. This pipe is supplied with pressurized gas from crankcase 3 of another cylinder. This other cylinder is similar to that in FIG. 3. The elements common to FIG. 9 and FIG. 3 have the same reference numerals in the two figures.

There is a non-zero angular displacement between the operating cycles of cylinder 1A and cylinder 1.

Reference 8A designates the exhaust pipe of cylinder 1A. This pipe 8A is connected to exhaust pipe 8 upstream of valve 22 when the latter is common to the two cylinders. Otherwise, a throttle valve may be located in the vicinity of the exhaust port of each cylinder upstream of the connection between pipe 8A and pipe 8.

The angular displacement between the cycles of the two cylinders 1 and 1A allows a satisfactory injection pressure to be available as described in European application 88.401569.4 filed on Jun. 22, 1988 to which reference may be made.

According to the embodiment in FIG. 9, pipe 17A has no check valve in the part which connects crankcase 3 to pneumatic injector 15A.

Thus, this pipe does not act as a pressurized-gas storage volume, and its capacity may be small.

In general, the element restricting the exhaust flowrate may be any throttle valve, flap, or plug located inside the exhaust pipe or in the vicinity of the exhaust ports in the cylinder wall.

These shutoff elements may be connected mechanically by any means such as articulated rods to the throttle valves or plugs which admit air to the crankcase, the position whereof depends on the engine load.

It is also possible to use powered shutoff elements whose opening and closing is controlled by electronic means which use as input data the engine speed and load parameters. These parameters may be of different types, and the data picked up by sensors may relate for example to the opening of the throttle valve or plug of the intake pipe or to the intake pressure value.

Other engine parameters indicating its speed and load may also be taken into account, including the temperature of the intake air, the temperature of the engine cooling water, or various engine pressures whose value will be compared to atmospheric pressure.

FIGS. 5, 6, 7, and 8 show schematically the cylinder head 30 of a two-stroke engine with three cylinders 31a, 31b, and 31c. Exhaust pipes 32a, 32b, and 32c from these three cylinders are connected to a common exhaust pipe 33 whose position with respect to these pipes may vary.

In the case where this pipe 33 has only one branch (FIGS. 5 and 6), flowrate restriction device 35 according to the invention will preferably be located at the inlet to this common pipe such as to ensure flowrate restriction for all three cylinders. This arrangement has the advantage of simplifying the design and control of the flowrate restriction device common to all three cylinders. This arrangement also allows advantage to be taken of favorable interferences between the pressure waves from the exhausts of the various cylinders.

In the case of FIGS. 7 and 8, pipe 33 has two branches 33a and 33b, themselves connected to a common pipe 34.

In the embodiment shown in FIG. 7, two flowrate restriction elements 35 and 35' are disposed at the inlets of branches 33a and 33b in the case of FIG. 8, and a single flowrate restriction element 35 is disposed at the inlet to pipe 34. The latter arrangement has the advantage of being simpler but the flowrate restrictin element is then relatively distant from the cylinders.

It is obvious that the engine according to the invention may have any type of exhaust flowrate restriction element whose opening and closing is controlled by any mechanical, electronic, or other means.

Finally, the engine according to the invention may have any number of cylinders located in any arrangement.

I claim:

1. Two-stroke engine having at least one cylinder in which a piston moves, a crank case communicating with one end of the at least one cylinder and having means for admitting air into the crank case, at least one pipe means for admitting unmixed air from the crank case to a cylinder transfer port, means for pneumatically injecting fuel into the at least one cylinder comprising pneumatic injector means, means for supplying and metering fuel to said pneumatic injector means, and pipe means connected to the crank case by a valve means and forming a volume of pressurized air connected to the pneumatic injector means for supplying the pneumatic injector means with pressurized air for atomizing the fuel, an exhaust pipe means connected to the at least one cylinder by an exhaust port located in a position offset in a direction of travel of the piston with respect to the cylinder transfer port, and at least one restricting means disposed inside the exhaust pipe means for restricting a passage of exhaust gases, said restricting means being controlled and adjusted so as to be opened and closed as a function of at least one engine operating parameter.

2. Two-stroke engine according to claim 1, wherein the restriction means includes a throttle valve means located inside the exhaust pipe means near the cylinder.

3. Two-stroke engine according to claim 1, wherein the restriction means includes a flap means pivotably mounted on the cylinder at an inlet of the exhaust pipe means and being adapted to cover, in a controlled manner, the exhaust port.

4. Two-stroke engine according to one of claims 1, 2 or 3, wherein the restriction means is connected by an articulated mechanical assembly to a flow-rate restriction means located in a pipe which forms in part the means for admitting air into the crankcase.

5. Two-stroke engine according to one of claims 1, 2 or 3, wherein the restriction means is powered and electronic which takes into account means are provided for opening or closing the restriction means as a function of the at least one parameter, and wherein said at least one parameter is engine speed or engine load.

6. Two-stroke engine according to claim 1, including at least two cylinders each having an exhaust pipe means connected to a common exhaust pipe means, wherein the restriction means is disposed in the common exhaust pipe means.

7. Two-stroke engine according to claim 6, wherein the common exhaust pipe means includes two branches.

8. Two-stroke engine according to claim 7, wherein two restriction means are provided and are respectively disposed in each of the two branches of the common exhaust pipe means.

9. Two-stroke engine according to claim 7, wherein the restriction means is disposed in a pipe means to which the branches of the common exhaust pipe means are connected.

10. Two-stroke engine including a first cylinder having a first piston movable therein, a second cylinder having another piston movable therein, crank case means communicating with one end of said second cylinder and having means for admitting air into the crank case means, at least one pipe means for admitting non-mixed air into said first cylinder, said pipe means being connected to an opening in said first cylinder, means for pneumatically injecting fuel into said first cylinder comprising a pneumatic injector means, means for supplying and metering fuel into said pneumatic injector means, pipe means connected to the crank case means for supplying the pneumatic injector means with pressurized air for atomizing the fuel, exhaust pipe means connected to said first cylinder by an exhaust port located in a wall of said first cylinder, an exhaust gas passage restriction means disposed inside said exhaust gas pipe means in a vicinity of said first cylinder for restricting a passage of exhaust gas, said restriction means being controlled and adjusted so as to be opened and closed as a function of at least one engine operating parameter and by there being a non-zero angular displacement between cycles of said cylinders.

11. Two-stroke engine according to claim 10, wherein said angular displacement is 120°, and wherein the cycle of the first cylinder leads the cycle of the second cylinder by 120°.

12. Two-stroke engine according to claim 10, wherein said displacement is 90°, and wherein the cycle of the first cylinder leads the cycle of the second cylinder by 90°.

13. Two-stroke engine according to claim 11, wherein said engine has a number of cylinders which is a multiple of three.

14. Two-stroke engine according to claim 12, wherein said engine has a number of cylinders which is a multiple of four.

15. Engine according to one of claims 10, 11, 12, 13 or 14, wherein said pipe means for supplying the pneumatic, injector means with pressurized air directly connects said pneumatic injector means to said crank case means.

* * * * *